(12) United States Patent
Orita

(10) Patent No.: US 7,119,715 B2
(45) Date of Patent: Oct. 10, 2006

(54) PARKING LOT ATTENDANT ROBOT SYSTEM

(75) Inventor: Atsuo Orita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 153 days.

(21) Appl. No.: 11/006,302

(22) Filed: Dec. 7, 2004

(65) Prior Publication Data
US 2005/0240323 A1    Oct. 27, 2005

(30) Foreign Application Priority Data
Mar. 31, 2004    (JP)    ............................ 2004-106578

(51) Int. Cl.
*B60Q 1/48*    (2006.01)
(52) U.S. Cl. .................... 340/932.2; 340/933; 701/200
(58) Field of Classification Search ............. 340/932.2, 340/933; 701/200, 301
See application file for complete search history.

(56) References Cited

U.S. PATENT DOCUMENTS

| | | | | |
|---|---|---|---|---|
| 5,940,014 A | * | 8/1999 | Hartt ............................ | 340/953 |
| 6,077,017 A | * | 6/2000 | Durant ......................... | 414/254 |
| 6,405,132 B1 | * | 6/2002 | Breed et al. ................. | 701/301 |
| 6,525,510 B1 | * | 2/2003 | Ayano et al. ................. | 320/109 |
| 6,650,250 B1 | * | 11/2003 | Muraki ..................... | 340/932.2 |
| 6,970,101 B1 | * | 11/2005 | Squire et al. ............ | 340/932.2 |
| 7,039,520 B1 | * | 5/2006 | Draeger et al. ............. | 701/211 |

FOREIGN PATENT DOCUMENTS

| | | |
|---|---|---|
| JP | 2000-72019 | 3/2000 |
| JP | 2003-104220 | 4/2003 |
| JP | 2003-339060 | 11/2003 |
| JP | 2004-94288 | 5/2004 |
| JP | 2004-171165 | 5/2004 |

* cited by examiner

*Primary Examiner*—Daryl C Pope
(74) *Attorney, Agent, or Firm*—Rankin, Hill, Porter & Clark LLP

(57) ABSTRACT

A parking lot attendant robot is provided with a camera for capturing an image of an vehicle and a parking space, and a receiver from receiving vehicle information such as the steering angle, shift position and vehicle speed from the vehicle. Based on the knowledge of the position of the vehicle with respect to the parking space gained from the camera and the vehicle information received from the vehicle, the robot computes the optimum parking path which the vehicle should follow. The robot signals the motorist by a visual and/or auditory display and/or a hand signal as to how the steering wheel should be turned and which way the vehicle should move or stop for the vehicle to follow this parking path and to be successfully parked in the prescribed parking space.

11 Claims, 4 Drawing Sheets

PARKING LOT ATTENDANT ROBOT SYSTEM

TECHNICAL FIELD

The present invention relates to a parking lot attendant robot system that includes a parking lot attendant robot for guiding a motorist park his/her vehicle (automobile) in a parking lot.

BACKGROUND OF THE INVENTION

Proposals have been made to provide a system for guiding an vehicle to a prescribed parking space as can be found in Japanese patent laid-open publications Nos. 2003-104220, 2000-072019 and 2003-339060. Such a parking guide system typically comprises an onboard camera for capturing the image of the area around the parking space to acquire the information required for guiding the vehicle. However, to obtain the image information and other data required for guiding the vehicle solely from the end of the vehicle, cameras, various sensors and a control unit that are highly expensive are required to be mounted on the vehicle, and this adds to the cost of the vehicle to an unacceptable extent.

On the other hand, if a robot that can move about in the parking lot is used for guiding each vehicle, the vehicles are not required to be provided with any expensive guide system, and the required overall cost can be minimized. For this purpose, the robot is required to be equipped with a camera for capturing the image of the vehicle and parking spaces and a control unit for obtaining the necessary information and providing an appropriate guidance to each vehicle.

The assignee of this application previously proposed robot systems that could be applied to a robot system for guiding an vehicle to a prescribed parking space as can be found in Japanese patent laid-open publication No. 2004-094288 that discloses a device for analyzing the image of an object for the purpose of obtaining information on the object and Japanese patent laid-open publication No. 2004-171165 that discloses a system for recognizing a moving object at a high precision.

Oftentimes, the parking space may not be very spacious, and it may not be easy for a motorist to park the vehicle. Curbside parking and backing into a parking space from an oblique angle are known to cause some difficulty to inexperienced motorists. In such cases, properly selecting the steering angle at each moment is highly important for successful parking. It is therefore desired that a robot is able to give a proper guidance on the steering angle to the motorist at each moment in such a manner that the motorist can follow the guidance without difficulty.

BRIEF SUMMARY OF THE INVENTION

In view of such problems of the prior art and the recognition of the inventors, a primary object of the present invention is to provide a robot system that can provide a parking guidance to a motorist without requiring any expensive onboard equipment.

A second object of the present invention is provide a robot system including a robot that can give a proper and easy-to-follow guidance to a motorist when he/she attempts to park the vehicle in a prescribed parking space.

According to the present invention, these and other objects can be accomplished by providing a parking lot attendant robot system including a robot placed in a parking lot for giving guidance to a motorist who wishes to park an vehicle in a prescribed parking space defined within the parking lot, comprising: a robot provided with traveling means for moving about at least within the parking lot; a control unit for controlling various actions of the robot; image capturing means for capturing at least an image of the vehicle that is desired to be guided to the parking space and identifying the position of the vehicle relative to the parking space; parking path computing means for computing a parking path which the vehicle should follow for the vehicle to be properly parked in the parking space according to the position of the vehicle identified by the image capturing means; a vehicle information sensor for detecting vehicle information including a steering angle; vehicle information transmitting means for transmitting the vehicle information to the control unit; guidance information generating means for generating a guidance information including a target steering angle for the vehicle according to the vehicle information and the parking path computed by the parking path computing means; and guidance information transmitting means for transmitting the guidance information from the control unit to the vehicle or a motorist driving the vehicle.

Even when the motorist is not able to readily find the optimum course into the prescribed parking space as is the case with curbside parking and backing up into a parking space from an oblique angle, the robot may be located in a favorable position for looking over the parking space and vehicle, and can provide the motorist with the guidance which is both proper and easy to follow. Thus, the robot is able to provide a proper guidance for the steering angle which is highly crucial in successfully parking the vehicle. Preferably, for providing a thorough parking guidance, the vehicle information may further include a shift position and traveling speed of the vehicle.

The guidance information generating means may be adapted to generate a movement guidance information indicating if the vehicle should move forward or backward and should stop, and the guidance information transmitting means may be adapted to transmit the movement guidance information to the vehicle or a motorist driving the vehicle. Thereby, the robot is able to guide the motorist if he/she may move forward or backward in each situation.

Also, the guidance information generating means may be adapted to generate a position information indicating a relative position between the vehicle and prescribed parking space, and the guidance information transmitting means may be adapted to transmit the position information to the vehicle or a motorist driving the vehicle. Thereby, the motorist is able to be informed of the current position of the vehicle so that the motorist is able to handle the vehicle with confidence.

The image capturing means may consist of a fixed camera or cameras placed in suitable parts of the parking space, but it is more preferable for precise recognition of the vehicle to have the robot carry a camera, preferably a stereoscopic camera that can allows a three-dimensional recognition of the vehicle and surrounding part of the parking lot.

According to a preferred embodiment of the present invention, the control unit and guidance information transmitting means are carried by the robot whereby the robot is enabled to communicate directly with the vehicle and/or motorist. Similarly, the guidance information transmitting means may comprise a wireless transmitter carried by the robot for transmitting the guidance information and an onboard receiver carried by the vehicle adapted to receive and visually and/or auditorily display the guidance information. Alternatively or additionally, the guidance information transmitting means may comprise a behavior generating unit and an actuator for moving a part of the body of the robot so as to signal the motorist in an intuitively clear manner. If desired, the guidance information transmitting means may comprise a speech generating unit and a speaker for auditorily providing guidance information to the motorist. A speaker may also serve as a means for warning the motorist under certain undesired situations.

The recognition of the layout of the parking space can be accomplished if the image capturing means is adapted to capture an image of the parking space. Alternatively or additionally, the control unit may be provided with a map of the parking lot and is adapted to identify the position of the robot on the map according to the captured image of the vehicle. In either case, the control unit is able to identify the position of the vehicle in relation with the geography of the parking lot at all times, and this allows the control unit to compute the parking path at a high precision.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
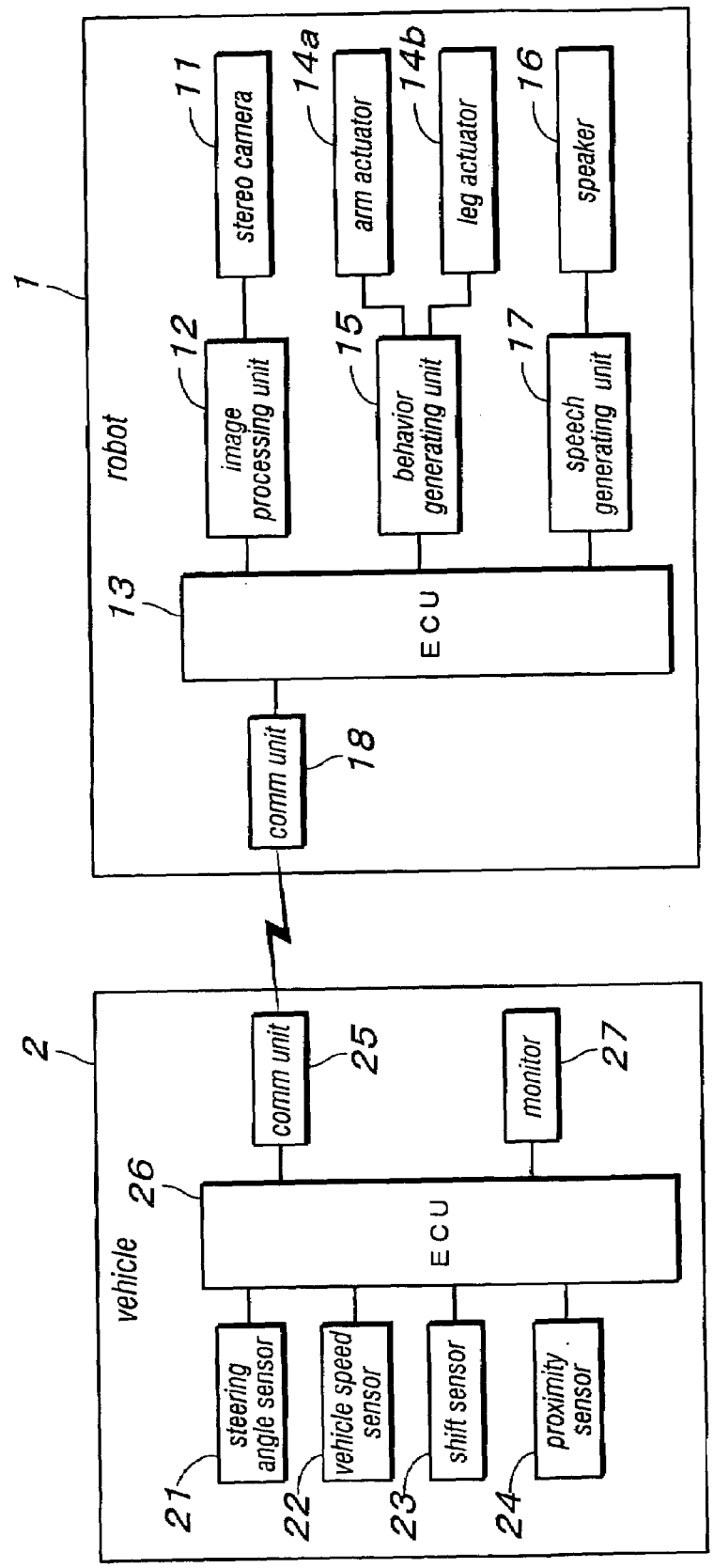
FIG. 1 is a block diagram of the robot system including a parking lot attendant robot and onboard equipment provided in the vehicle embodying the present invention.
Figure 2:
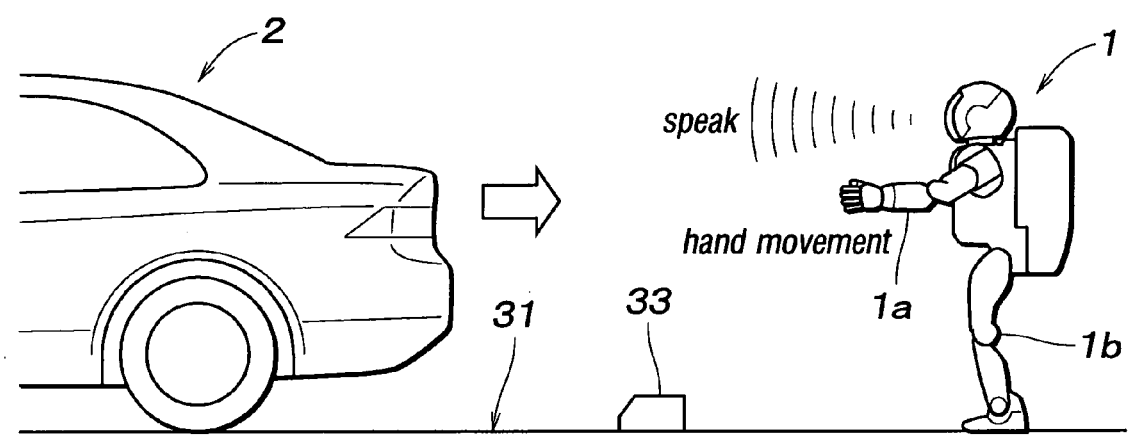
FIG. 2 is a side view showing the parking lot attendant robot of FIG. 1 guiding a motorist into a parking space.

FIG. 1 is a block diagram of a system including a parking lot attendant robot 1 and an vehicle 2 which is to be guided by the robot 1. FIG. 2 is a side view of the robot 1 and the vehicle 2 that is being guided by the robot. The parking lot attendant robot 1 is placed in a parking lot to guide the vehicle 2 to a prescribed parking space 31.

The vehicle 2 that is to be guided by the robot 1 comprises a steering angle sensor 21, a vehicle speed sensor 22, a shift sensor 23, a proximity sensor 24, a communication unit 25 for sending vehicle information to the robot 1 via a wireless LAN or the like, and an ECU 26 for controlling these components. The ECU 26 is programmed so as to transmit vehicle information including the steering angle, vehicle speed, shift position and presence of objects in the proximity obtained by the sensors 21 to 24 to the robot 1 upon receiving such a request from the robot 1 via the communication unit 25.

The robot 1 is provided with a stereo camera 11 for capturing the image of the vehicle to be guided and an allocated parking space 31, and an image processing unit 12 for obtaining information that is required to guide the vehicle from the camera 11. The image processing unit 12 detects the vehicle 2 and parking space 31 from the image information obtained by the camera 11 to obtain the position information that is required for guiding the vehicle.

The stereo camera 11 consists of a pair of color CCDs that are laterally spaced from each other, and is able to obtain information on the distances from the camera 11 to the vehicle 2 and parking space 31 by comparing the two images captured by the two CCDs. Also, the outline of the vehicle 2 is extracted by using such techniques as the dynamic outline model so that the orientation (angle) of the vehicle 2 relative to the parking space 31 may be detected, and the relative position between the vehicle 2 and parking space 31 as seen in the plan view is determined.

The detection of the parking space 31 can also be accomplished by identifying the current position of the vehicle in a map of the parking lot stored in the database of the ECU 13. In such a case, the captured image of the vehicle enables the ECU 13 to determine the position of the robot 1 in relation with the map. Pattern matching techniques may also be applied by looking for special marks or existing marks such as white lines, curbstones and parking space numbers.

The ECU 13 executes the process of computing the path of the vehicle 2 for leading the vehicle 2 to the prescribed parking space 31 according to the position information obtained by the image processing unit 12. Based on the obtained parking path, the information for guiding the motorist is generated by the ECU 13.

The information for guiding the motorist includes a steering angle guidance information for indicating in which direction and how far the steering wheel is required to be turned. More specifically, when the motorist is turning the steering wheel, the robot 1 determines if the steering wheel is being turned in the correct direction, and advises the motorist to maintain the steering angle, turn the steering wheel in the opposite direction, and so forth. Thereby, the motorist is able to know if the steering wheel should be continued to be turned or should be turned in the opposite direction.

The ECU 13 then generates movement guidance information that indicates if the vehicle 2 may proceed to the parking space 31. In other words, the motorist is guided if the vehicle 2 may proceed with the current steering angle. The ECU 13 at this time compares the target steering angle for the given-parking path with the current steering angle, and advises the motorist to proceed if the difference is within a prescribed tolerance range.

The ECU 13 also generates position information on the relative position between the current position of the vehicle 2 and parking space 31. The position information enables the motorist to know how far the vehicle 2 is required to travel before reaching the prescribed parking position. The robot 1 may inform the motorist of the distance to the prescribed parking position and guide the motorist to stop the vehicle when the vehicle has reached the prescribed parking position.

The robot 1 is additionally provided with arm actuators 14a, leg actuators 14b and a behavior generating unit 15 for generating appropriate behavior information and driving the actuators 14a and 14b accordingly. Thereby, the robot 1 is able to move about by using the leg actuators 14b so that the robot may place itself visible to the motorist and continue to provide guidance until the vehicle is properly parked in the parking space.

The robot 1 can give a guidance to the motorist by the movement of the arms 1a of the robot 1 as illustrated in FIG. 2 according to the behavior pattern generated by the behavior generating unit 15 which in turn receives commands from the ECU 13.

The arm movement of the robot 1 may include the turning of the arm in a full circle to indicate the direction of the turning of the steering wheel, the swinging of the raised arm back and forth with the palm of the hand facing rearward to indicate the movement of the vehicle toward the robot, and the swinging of the raised arm back and forth with the palm of the hand facing forward to indicate the movement of the vehicle away from the robot. The robot may lift fingers to indicate the remaining distance to the proper parking position as being so many meters as the number of the lifted fingers.

The robot 1 is required to have at least arms 1a to be able to provide a guidance for a motorist, and is preferably formed so as to simulate an upper half part of a human body. For the robot 1 to be able to move about within the parking lot, it is preferably provided with legs 1b or other traveling means such as wheels and crawlers.

The robot 1 is additionally provided with a speaker 16 to provide a speech guidance to the motorist. When guidance information is generated by the ECU 13, a speech synthesis process in executed in the speech generating unit 17 according to the text information provided by the ECU 13.

The robot 1 may be made to say, for instance, "Turn the steering wheel in the opposite direction" to give a steering guidance, and "Keep on moving forward" to give a movement guidance. Thereby, the motorist can receive a clear guidance as to the current position of the vehicle and how the vehicle should be operated for the vehicle to be parked properly in the designated parking space.

The robot 1 is provided with a communication unit 18 for communicating with the vehicle 2 via the communication unit 25 thereof, and is thereby supplied with the data of the vehicle 2 such as the steering angle, shift position and vehicle speed.

The communication unit 18 may transmit signals including the guidance information generated by the ECU 13 to the communication unit 25 of the vehicle 2 so that the guidance information may be displayed on a monitor 27 provided on the instrument panel of the vehicle 2. Thereby, the motorist can obtain the necessary guidance information in the form of graphic/text information on the monitor 27.

The monitor 27 may show if the current steering angle is proper or not, in which direction the steering wheel should be turned, and so on by using graphic/text representation. The monitor 27 may also show if the vehicle may continue to move or should stop by using graphic/text representation. The positional guidance may be given by a number indicating how many more meters the vehicle must move before reaching the prescribed parking position, or the position of the vehicle in relation with the parking space may be shown in a plan view on the monitor.

Figure 3:
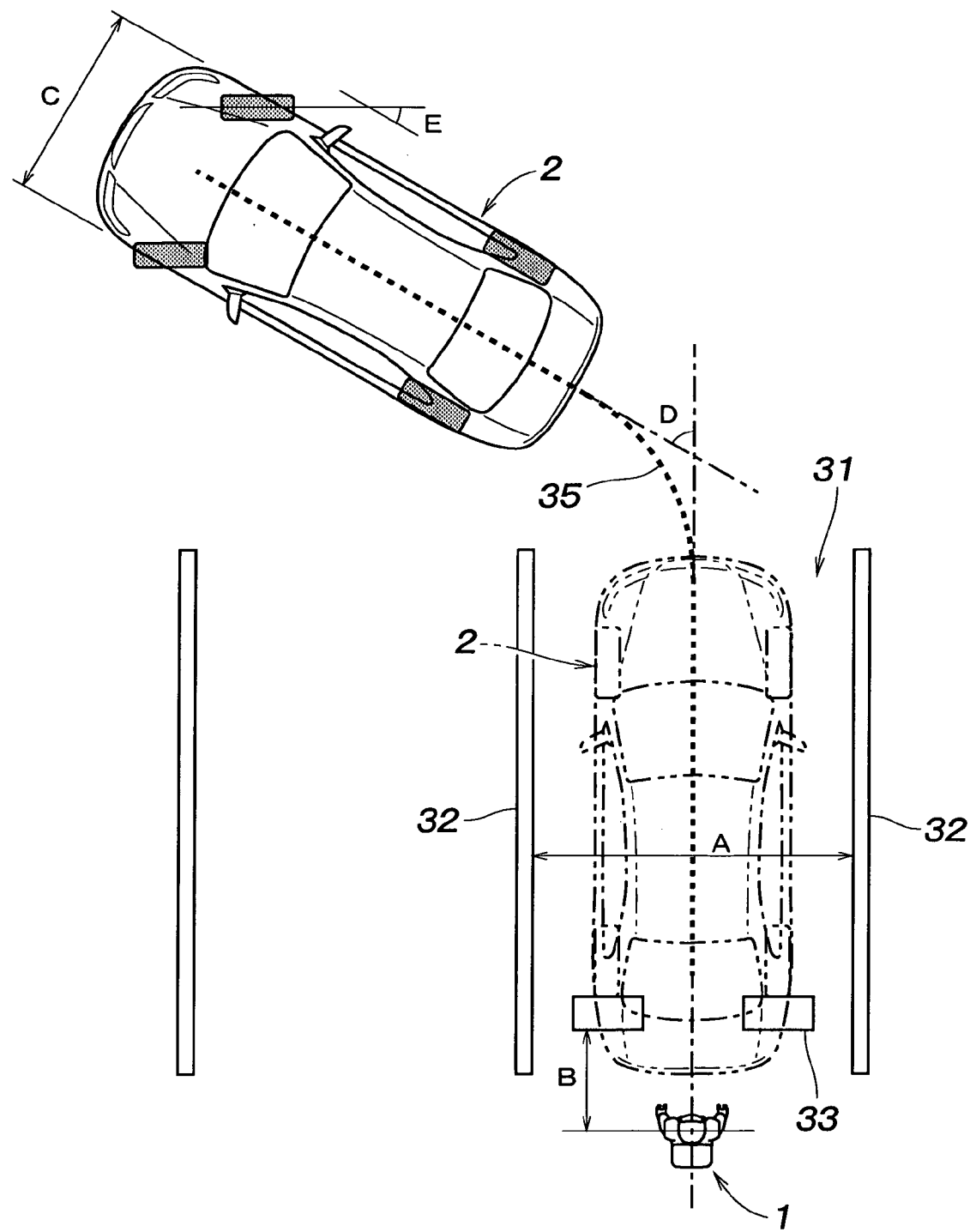
FIG. 3 is a plan view showing the parking lot attendant robot of FIG. 1 guiding the motorist into the parking space.

FIG. 3 is a plan view of the vehicle 2 and robot 1 when the vehicle 2 is moving toward the prescribed parking position aided by the robot 1. The robot 1 stands at a position from which the robot 1 is able to see both the vehicle and parking space. At the same time, the robot 1 should stand so as to be visible to the motorist without obstructing the movement of the vehicle. In the illustrated embodiment, the robot 1 stands immediately behind the concrete wheel stops 33.

The robot 1 receives from the image processing unit 12, as position information, the width A of the parking space 31 defined by the while lines 32, distance B from the robot to the wheel stops 33 and the inclination angle D of the vehicle with respect to the center line of the parking space 31. The robot also receives vehicle information such as the width C of the vehicle 2 and steering angle E via the wireless LAN.

The ECU 13 of the robot computes an optimum parking path 35 for guiding the vehicle to the parking space according to such position information and vehicle information, and computes the target steering angle to achieve this parking path at each moment. The robot 1 then generates steering guidance information indicating if the current steering angle is proper or in which direction the steering wheel should be turned, movement guidance information indicating if the vehicle may continue to move forward or backward, and positional guidance information indicating the relative position between the vehicle 2 and parking space 31.

Figure 4:
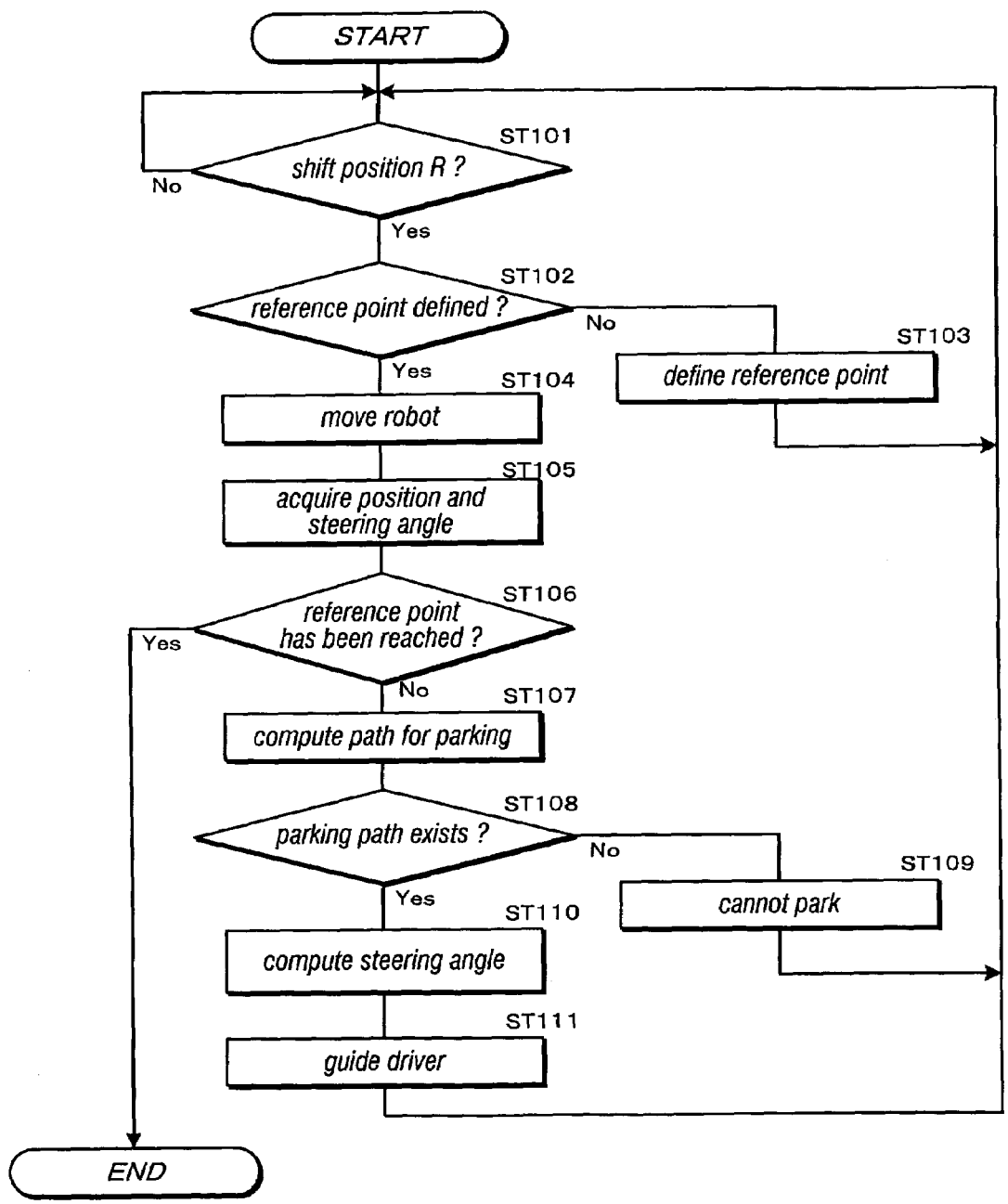
FIG. 4 is a flowchart showing the process executed by the parking lot attendant robot of FIG. 1.

FIG. 4 is a flowchart showing the control process executed by the robot 1 when guiding the vehicle to back up into the prescribed parking space 31 as illustrated in FIGS. 2 and 3. First of all, the ECU 12 determines the shift position of the vehicle 2 according to the shift position information obtained from the vehicle in step 101. If the shift position is R (reverse), the program flow advances to step 102 to determine if a parking reference point has been defined. The parking reference point may consist of any point in the parking space that enables the robot to identify the geography of the parking space or identify the position of the parking space. If not, the program flow advances to step 103 to define a parking reference point. Once the parking reference point is defined, the program flow advances to step 104 to have the behavior generating unit 15 to command the robot to move to a suitable location near the parking space to guide the motorist.

The image of the vehicle and parking space 31 is captured by the camera in step 105, and the position of the vehicle is determined from the captured image, and the steering angle information is obtained from the vehicle 2. It is determined if the vehicle has reached the prescribed parking position in step 106. If the vehicle has not reached the prescribed parking position, the program flow advances to step 107 to compute the remaining parking path which the vehicle must follow before reaching the prescribed parking position. It is then determined in step 108 if a valid parking path exists. If there is no valid parking path, the program flow advances to step 109 to inform the motorist that it is not possible to park the vehicle.

If a valid parking path exists in step 108, the program flow advances to step 110 to compute the steering angle that is required to follow the parking path at each moment. At the same time, the ECU 13 executes a process of generating the guidance information according to the current vehicle information such as the current steering angle and the positional information of the vehicle. The robot 1 then provides a guidance to the motorist by indicating if the vehicle may maintain its course into the parking space and how far the vehicle needs to travel before reaching the prescribed parking position by using hand movement, speech and/or graphic/text display until the vehicle is properly parked in the prescribed parking space.

Thus, according to the present invention, owing to the use of a robot that can obtain positional information and vehicle information and provide a parking guidance according to such information, the motorist can receive a proper and clear guidance from the robot without requiring any expensive onboard equipment.

Although the present invention has been described in terms of a preferred embodiment thereof, it is obvious to a person skilled in the art that various alterations and modifications are possible without departing from the scope of the present invention which is set forth in the appended claims. For instance, in the illustrated embodiment, the various components were incorporated in the robot itself, but some of the components, including a central control unit, may be placed in a fixed station which is adapted to exchange data with the robot via wireless communication.

The invention claimed is:

1. A parking lot attendant robot system including a robot placed in a parking lot for giving guidance to a motorist who wishes to park an vehicle in a prescribed parking space defined within the parking lot, comprising:
- a robot (1) provided with traveling means (1*b*, 14*b*) for moving about at least within the parking lot;
- a control unit (13) for controlling various actions of the robot;
- image capturing means (11, 12) for capturing at least an image of the vehicle (2) that is desired to be guided to the parking space (31) and identifying the position of the vehicle relative to the parking space;
- parking path computing means (13) for computing a parking path which the vehicle should follow for the vehicle to be properly parked in the parking space according to the position of the vehicle identified by the image capturing means;
- a vehicle information sensor (21–24) for detecting vehicle information including a steering angle;
- vehicle information transmitting means (25) for transmitting the vehicle information to the control unit;
- guidance information generating means (13) for generating a guidance information including a target steering angle for the vehicle according to the vehicle information and the parking path computed by the parking path computing means; and
- guidance information transmitting means (15, 14*a*; 18, 25, 27) for transmitting the guidance information from the control unit to the vehicle or a motorist driving the vehicle.

2. A parking lot attendant robot system according to claim 1, wherein the guidance information generating means is adapted to generate a movement guidance information indicating if the vehicle should move forward or backward and should stop, and the guidance information transmitting means is adapted to transmit the movement guidance information to the vehicle or a motorist driving the vehicle.

3. A parking lot attendant robot system according to claim 1, wherein the guidance information generating means is adapted to generate a position information indicating a relative position between the vehicle and prescribed parking space, and the guidance information transmitting means is adapted to transmit the position information to the vehicle or a motorist driving the vehicle.

4. A parking lot attendant robot system according to claim 1, wherein the image capturing means is carried by the robot.

5. A parking lot attendant robot system according to claim 1, wherein the control unit and guidance information transmitting means are carried by the robot whereby the robot is enabled to communicate directly with the vehicle and/or motorist.

6. A parking lot attendant robot system according to claim 5, wherein the guidance information transmitting means comprises a wireless transmitter carried by the robot for transmitting the guidance information and an onboard receiver carried by the vehicle adapted to receive and visually and/or auditorily display the guidance information.

7. A parking lot attendant robot system according to claim 5, wherein the guidance information transmitting means comprises a behavior generating unit and an actuator for moving a part of the body of the robot so as to signal the motorist.

8. A parking lot attendant robot system according to claim 5, wherein the guidance information transmitting means comprises a speech synthesis unit and a speaker for auditorily providing guidance information to the motorist.

9. A parking lot attendant robot system according to claim 4, wherein the image capturing means is adapted to capture an image of the parking space.

10. A parking lot attendant robot system according to claim 4, wherein the control unit is provided with a map of the parking lot and is adapted to identify the position of the robot on the map according to the captured image of the vehicle.

11. A parking lot attendant robot system according to claim 1, wherein the vehicle information further includes a shift position and traveling speed of the vehicle.

* * * * *